(No Model.)

T. A. EDISON.
REGULATOR FOR DYNAMO ELECTRIC MACHINES.

No. 278,414. Patented May 29, 1883.

WITNESSES:
Edw. C. Rowlands
H. W. Seely

INVENTOR:
Thomas A. Edison
By Rich'd N. Dyer
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

REGULATOR FOR DYNAMO-ELECTRIC MACHINES.

SPECIFICATION forming part of Letters Patent No. 278,414, dated May 29, 1883.

Application filed December 8, 1882. (No model.)

*To all whom it may concern:*

Be it known that I, THOMAS A. EDISON, of Menlo Park, in the county of Middlesex and State of New Jersey, have invented a new and useful Improvement in Regulators for Dynamo-Electric Machines, (Case No. 522,) of which the following is a specification.

My invention relates to an improvement on the regulator described in my application No. 72,523, wherein a dynamo-electric machine is shown having a portion of the coils of its field-magnet included directly in the main circuit from the machine and the remaining portion in a multiple-arc circuit from said main circuit, differences in the number of translating devices connected in multiple arc with the machine by varying the current in the two sets of coils oppositely, but in different proportions, properly regulating the generation of current by the machine. Variations in speed of the armature are, however, not compensated for in a regulator of this kind; and my present invention consists in combining with such a regulator means actuated by variations in the speed of the armature for varying the position of the commutator-brushes, so as to regulate the generation of current according to such variations in speed.

Figure 1:
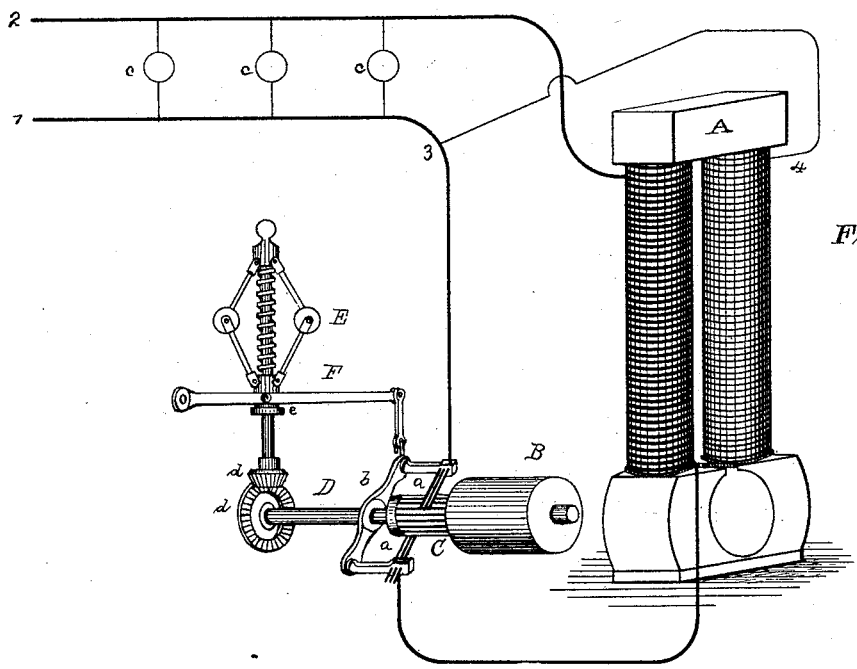
Figure 2:
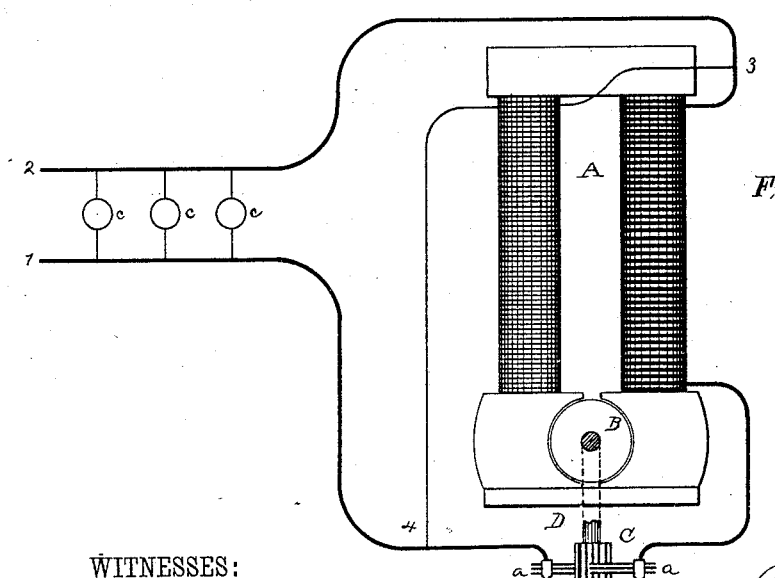

My invention is illustrated in the accompanying drawings, wherein Figure 1 is a view in perspective of a dynamo-electric machine embodying my invention, the armature being, for convenience, shown apart from the field-magnets, and the circuits being shown diagrammatically; and Fig. 2 represents the machine in elevation, with a top view of the brush-adjusting devices.

A is the field-magnet, B the armature, and C the commutator-cylinder, of the machine. The commutator-brushes $a$ $a$ are attached to a yoke, $b$, pivoted on the shaft D. Main conductors 1 2 extend from the commutator-brushes, and translating devices $c$ $c$ are placed in multiple arc across said conductors. A part of the field-magnet coils are included in the main circuit 1 2, as shown, while the remainder are in a multiple-arc circuit, 3 4, of finer wire; and the generation of current is regulated according to variations in the number of translating devices by the effect produced in the field-coils by such variations, as explained in the application above referred to. A spring-governor, E, is revolved from the armature-shaft D through gears $d$ $d$, though it may be connected with said shaft by other suitable means. The sleeve $e$ on the governor-shaft is connected to arm F, which is attached to the pivoted yoke $b$, which holds the commutator-brushes. It is evident that an increase in the speed of the motor which drives the armature will cause the raising of the arm F, which moves the commutator-brushes $a$ $a$, so as to decrease the current taken from the machine, while a decrease in speed will produce an opposite result.

What I claim is—

1. The combination, with a dynamo or magneto electric machine and translating devices arranged in multiple arc, of connections whereby variations in current caused by variations in the number of said translating devices in circuit act directly upon the field-magnet of the machine to vary its intensity, and means actuated by variations in speed of the armature for shifting the commutator-brushes of the machine to compensate for such variations, substantially as set forth.

2. The combination, with a dynamo-electric machine having a portion of its coils included in the main circuit and translating devices arranged in multiple arc, of means actuated by variations in the speed of the armature for shifting the commutator-brushes to compensate for such variations, substantially as set forth.

3. The combination, with a dynamo-electric machine having a portion of its coils included in the main circuit and translating devices arranged in multiple arc, of a governor revolved by the armature-shaft and connected to the commutator-brushes, substantially as set forth.

This specification signed and witnessed this 28th day of November, 1882.

THOS. A. EDISON.

Witnesses:
H. W. SEELY,
E. H. PYATT.